March 28, 1950     H. J. GRAHAM     2,501,674
ELECTRICAL COUPLING
Filed Dec. 16, 1944

INVENTOR.
Harold J. Graham
BY
Roberts, Cushman & Grover
ATTORNEYS

Patented Mar. 28, 1950

2,501,674

UNITED STATES PATENT OFFICE 2,501,674

ELECTRICAL COUPLING

Harold J. Graham, Boston, Mass., assignor, by mesne assignments, to Mec-Elec Engineering Co., Boston, Mass., a corporation of Massachusetts Application December 16, 1944, Serial No. 568,443

3 Claims. (Cl. 173—363)

This invention relates to quickly detachable electrical couplings for connecting electric wires and cables, and more particularly for use where it is advantageous to have the ends of the coupling members covered at all times so as to prevent accidental short circuiting with the resultant mechanical injury to the end of the coupling member itself, or electrical injury to the adjoining apparatus, and to safeguard persons working with the equipment. According to the prior art most detachable electrical couplings are made in pairs, one of which is designed to receive the end of the other; however some connectors are of identical construction and obviate the necessity of selection. One or both of the current-carrying ends of such detachable electrical couplings are exposed and render them subject to mechanical injury and the workmen using them subjct to electric shocks.

Objects of the present invention are to provide detachable electrical couplings which are protected against careless use, which are identical in construction, which are easy to put together and when interlocked will not come apart accidentally, which afford good electrical contact between the parts, which provide a path of low resistance, in which arcing is reduced to a minimum when the parts are being uncoupled, which are simple and economical in construction, and which are durable, reliable, convenient and safe in use.

According to the present invention the coupling members are provided with contacts which telescope together, that is the end of each member is divided into at least three contacts which fit between the similarly corresponding contacts of the other member and preferably each contact has on its inner angular surface locking means which allow the two coupling members, when fitted together and then turned sufficiently to engage the respective locking means, to be locked against any outward longitudinal motion. Each coupling member is enclosed in an insulating sleeve, each sleeve extending at least to the free end of the coupling member and preferably beyond so that each coupling member is entirely surrounded when disconnected from the other member, and the entire coupling is covered when two members are joined together. At least one sleeve is retractible and may be composed of any suitable insulating material. While the sleeve may retract bodily, preferably it is collapsible. The device comprises means for automatically returning the retractible sleeve to its extended position. While this means may comprise a spring, where the sleeve is collapsible it preferably has sufficient natural elasticity to extend itself when collapsed. Upon connection of two coupling members the abutments of the ends of the sleeves pushing against each other tend to separate the connected members within said sleeves thus keeping the two coupling members in close locked connection and preventing the possibility of their becoming unlocked while thus engaged without sufficient rotation to unlock the contacts. It is desirable to provide the conducting terminal of each coupling member with at least three contacts so as to make their use more practical in work which causes the couplings to be subjected to a bending motion. It is preferred to bevel the axial edges of the outer ends of the contacts so as to facilitate connection with one another and also to provide a surface which will be less subject to mechanical damage. The destruction of metal by an electrical arc is proportional to the time required to break an electrical circuit. Due to the quick snap action of this detachable coupling the separation of the metal contacts is very rapid and thus prevents a destructive arc from occurring.

For the purpose of illustration typical embodiments of the invention are shown in the accompanying drawings in which Fig. 1 is an axial section of a detachable coupling in interlocked relationship;

Figure 1:
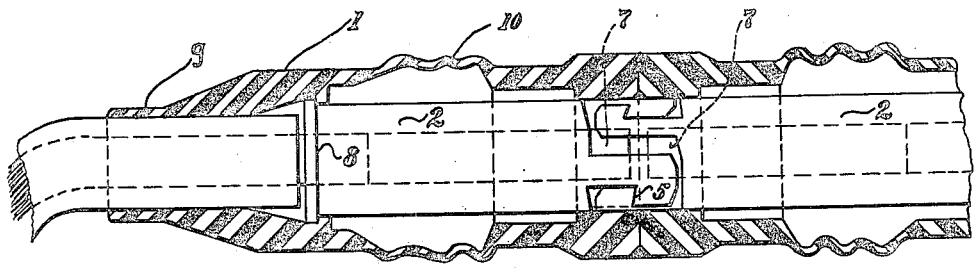
Figure 2:
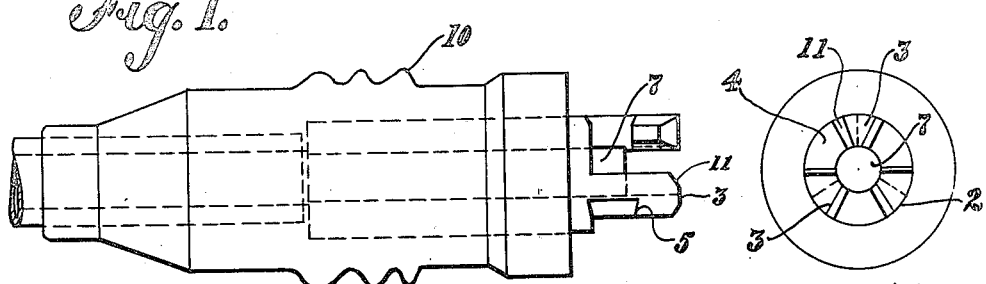
Fig. 2 is a side elevation of a coupling member with the sleeve retracted to show the conducting terminal and the locking feature of the contacts.
Figure 3:
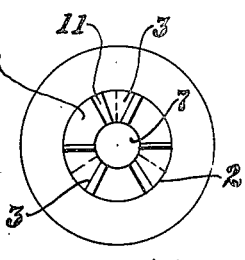
Fig. 3 is an end view of the coupling member.

The particular embodiment of the invention chosen for the purpose of illustration comprises a sleeve 1 encasing a coupling member 2 having its protruding terminal divided into at least three electrically conductive fingers 3 with slot-like spaces 4 therebetween, the fingers of one member extending into the slots of the other member, the extreme outer edges of the fingers 3 being bevelled at 11. The inner hook-like shoulders 5 of said contact members are adapted to engage in the slot-like spaces 4 between the corresponding shoulders 5 of the other coupling member in order to maintain the coupling members in a locked position when assembled in axial alignment. The bevelling on the shoulders 5 at 11 makes the mouths of the slots 4 larger which facilitates the insertion of the fingers 3. After the parts have been thus locked, said coupling members are held in firm electrical conductive relation with one another by means of the pressure created by the retraction of sleeve 1, as shown in Fig. 1, or by the pressure of the push spring 6 shown in Figs. 4 and 5. The alignment part 7 is an intgral part of each coupling member and its purpose is to maintain axial alignment when two coupling members are joined.

The angle of the inner surface of the hook-like shoulders 5 of said contacts is sufficient to maintain good locked electrical contact and to prevent the coupling from becoming easily disconnected. To quickly detach the coupling members it is only necessary to exert an inward longitudinal pressure sufficient to compress the sleeve slightly and then to rotate the parts slightly in the direction opposite to the locking direction so as to unlock the hook-like shoulders.

Figure 4:
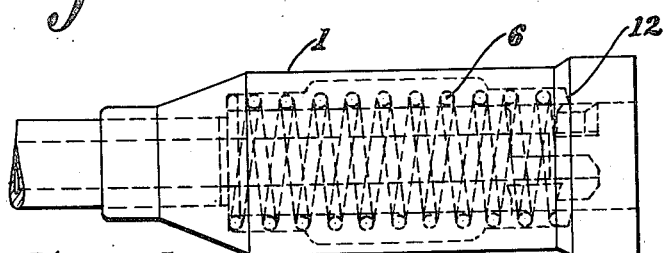
Fig. 4 is a side elevation of another embodiment of the invention using a push spring.
Figure 5:
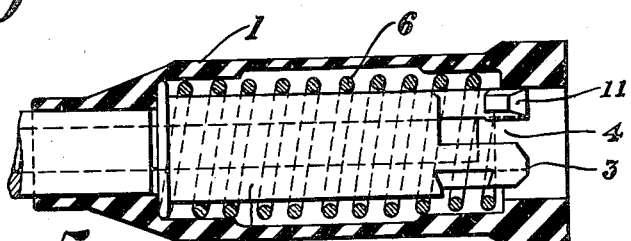
Fig. 5 is a cross-sectional view of Fig. 4.

At the opposite end of the coupling member from that comprising the contacts is a shoulder 8 encircling the member. This shoulder is the abutment against which the sleeve 1, as shown in Fig. 1, abuts. As shown in Figs. 4 and 5 this shoulder is the abutment for the spring 6, the opposite abutment for spring 6 being shoulder 12 on sleeve 1. The sleeve 1 comprises a neck 9 which firmly grips the cable or wire. Said neck may be permanently attached by any appropriate means to the jacket of the wire or cable once the coupling member has been attached thereto. Said sleeve 1 has at its approximate center a bellows-like portion 10, which in its relaxed disconnected condition covers the end of the coupling member as shown in Fig. 4, capable of allowing the sleeve 1 to be retracted making possible the locking of the contacts 3 by telescoping with the corresponding contacts of another coupling member. After locking of the coupling members by a rotating motion which engages angular surfaces 5 with opposite surfaces 5 of the second coupling member, the resiliency of the material comprising each sleeve 1 exerts an opposite pressure on angular surfaces 5 thereby holding the two members in firm contact with one another. In the embodiment shown in Figs. 4 and 5 the spring is the resilient means.

It should be understood that the present disclosure is for the purpose of illustration only and that this invention includes all modifications and equivalents which fall within the scope of the appended claims.

I claim:

1. An electrical connector comprising two identical coupling members each having one end adapted to be secured to a respective electrical conductor, the other end of each member having a plurality of equally spaced fingers for engaging the similar fingers of the mating member, each finger having an undercut portion forming a projecting shoulder and having less width than that of the slot between two adjacent fingers, the inner and outer surfaces of the fingers lying respectively in two coaxial cylinders whereby said members are assembled by inserting the fingers of each member in the slots of the corresponding member, one member then being rotated relatively to the other member so that the projecting shoulder of each finger engages the undercut portion of the correlated finger, said shoulders thereby acting as detents for preventing the separation of the members, a nonconducting sleeve slidably disposed circumjacent each of the respective members, and a spring for normally extending each of the respective sleeves over the fingers of its correlated member, each of said sleeves being retracted during assembly by the force exerted by the end of the other sleeve so that the fingers of each member can engage the fingers of the other member, the restoring force exerted by the springs insuring good electrical contact between the engaging fingers.

2. An electrical connector comprising two identical coupling members, each having a shouldered end adapted to be secured to a respective electrical conductor, the other end of each member having a plurality of equally spaced fingers for engaging the similar fingers of the mating member, each finger having an undercut portion forming a projecting shoulder and having less width than that of the slot between two adjacent fingers, the inner and outer surfaces of the fingers lying respectively in two coaxial cylinders whereby said members are assembled by inserting the fingers of each member in the slots of the corresponding member, one member then being rotated relatively to the other member so that the projecting shoulder of each finger engages the undercut portion of the correlated finger, said projecting shoulders thereby acting as detents for preventing the separation of the members, a nonconducting sleeve slidably disposed circumjacent each respective member and having an internal shoulder at one end thereof, and a spring interposed between each of the respective sleeves and its correlated member, the ends of the spring abutting the shoulders of the sleeve and member respectively, each of said sleeves being retracted during assembly by the force exerted by the end of the other sleeve so that the fingers of each member can engage the fingers of the other member, the restoring force exerted by the springs insuring good electric contact between the engaging fingers.

3. An electrical connector comprising two identical coupling members, each having one end adapted to be secured to a respective electrical conductor, the other end of each member having a plurality of fingers for engaging the similar fingers of the mating member, a nonconducting yieldable sleeve disposed circumjacent each of the respective members, and a spring for normally extending each of the respective sleeves over the full length of said fingers of its correlated member, each of said sleeves being retracted during assembly by the force exerted by the end of the other sleeve so that the fingers of each member can engage the fingers of the other member, the restoring force exerted by the springs insuring good electrical contact between the engaging fingers.

HAROLD J. GRAHAM.

REFERENCES CITED

The following references are of record in the file of this patent:

UNITED STATES PATENTS

| Number | Name | Date |
|---|---|---|
| 535,278 | Downing | Mar. 5, 1895 |
| 889,786 | Keiner | June 2, 1908 |
| 1,965,151 | Mueller | July 3, 1934 |
| 2,082,986 | Staley | June 8, 1937 |
| 2,093,037 | Douglas | Sept. 14, 1937 |
| 2,117,029 | Larsson | May 10, 1938 |
| 2,125,816 | Reynolds | Aug. 2, 1938 |
| 2,136,848 | Hassler | Nov. 15, 1938 |
| 2,396,872 | Miller et al. | Mar. 19, 1946 |
| 2,427,297 | Modrey | Sept. 9, 1947 |

FOREIGN PATENTS

| Number | Country | Date |
|---|---|---|
| 128,226 | Austria | May 10, 1932 |